United States Patent [19]

Hunter

[11] 4,297,226
[45] Oct. 27, 1981

[54] PROCESS FOR SECONDARY RECOVERY

[75] Inventor: Walter D. Hunter, Houston, Tex.

[73] Assignee: Texaco Development Corp., White Plains, N.Y.

[21] Appl. No.: 122,141

[22] Filed: Feb. 19, 1980

Related U.S. Application Data

[63] Continuation-in-part of Ser. No. 917,056, Jun. 19, 1978, abandoned.

[51] Int. Cl.³ .............................................. E21B 43/22
[52] U.S. Cl. ............................... 252/8.55 D; 166/275; 525/336
[58] Field of Search ................... 252/8.55 D; 166/274, 166/275; 525/336

[56] References Cited

U.S. PATENT DOCUMENTS

| | | | |
|---|---|---|---|
| 2,808,397 | 10/1957 | Stroh et al. | 525/336 |
| 3,002,960 | 10/1961 | Kolodny | 252/8.55 X |
| 3,508,612 | 4/1970 | Reisberg et al. | 252/8.55 X |
| 3,684,014 | 8/1972 | Norton et al. | 252/8.55 X |
| 3,709,297 | 1/1973 | Christopher et al. | 166/275 X |
| 3,804,173 | 4/1974 | Jennings | 252/8.55 X |
| 4,044,831 | 8/1977 | Allen | 166/275 |

FOREIGN PATENT DOCUMENTS 925130  3/1955  Fed. Rep. of Germany ...... 525/336

*Primary Examiner*—Herbert B. Guynn
*Attorney, Agent, or Firm*—Carl G. Ries; Robert A. Kulason; Walter D. Hunter

[57] ABSTRACT

Hydrocarbons are recovered from a subterranean hydrocarbon-bearing formation penetrated by an injection well and a production well by displacing hydrocarbons toward the production well using a drive fluid such as water thickened with polyacrylamide or partially hydrolyzed polyacrylamide alkoxylated with an alkylene oxide and, if desired, a small amount of a sulfated, alkoxylated polyacrylamide, i.e., an N-substituted polyacrylamide having N-substituents of the formula:

$$-(CH_2CH_2O)_m SO_3M,$$

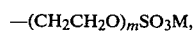

where m is an integer of from 1 to 5 and M is selected from the group consisting of hydrogen, sodium, potassium or ammonium. Optionally, the drive fluid can be saturated with carbon dioxide and/or natural gas at the injection pressure.

17 Claims, No Drawings

PROCESS FOR SECONDARY RECOVERY

This application is a Continuation-In-Part of application Ser. No. 917,056, filed June 19, 1978, now abandoned.

BACKGROUND OF THE INVENTION

1. Field of the Invention

This invention relates to a process for recovering hydrocarbons from a subterranean hydrocarbon-bearing formation penetrated by an injection well and a production well wherein a drive fluid such as water thickened with polyacrylamide or partially hydrolyzed polyacrylamide alkoxylated with ethylene oxide or a mixture of ethylene oxide and propylene oxide, is utilized to displace hydrocarbons in the formation toward a production well. If desired the drive fluid can contain a small amount of a water-soluble sulfated, ethoxylated polyacrylamide.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

There is a definite need in the art for a water flooding process in which the disadvantages discussed above are largely eliminated or avoided.

SUMMARY OF THE INVENTION

This invention relates to a process for recovering hydrocarbons from a subterranean hydrocarbon-bearing formation penetrated by an injection well and a production well which comprises:

(A) injecting into the formation via an injection well a drive fluid comprising water having dissolved therein a small amount of (1) polyacrylamide or (2) partially hydrolyzed polyacrylamide or the sodium, potassium or ammonium salt thereof alkoxylated with ethylene oxide or a mixture of ethylene oxide and propylene oxide wherein the weight percent of ethylene oxide in the said mixture is from about 60 to about 95, and, if desired, about 0.01 to about 5.0 weight percent of a sulfated, ethoxylated polyacrylamide or the sodium, potassium or ammonium salt thereof, (B) forcing the said fluid through the formation and (C) recovering hydrocarbons through the production well.

In another embodiment of this invention the drive fluid may comprise water or brine having dissolved therein a small amount, i.e., about 0.01 to about 5.0 weight percent of a sulfated, ethoxylated polyacrylamide or the sodium, potassium or ammonium salt thereof.

An additional embodiment of this invention relates to the driving fluid compositions utilized in step (A) which may be saturated with carbon dioxide and/or natural gas, if desired.

DETAILED DESCRIPTION OF THE INVENTION

Prior to practicing the process of this invention it is sometimes desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction into the formation at pressure of from about 300 to about 3000 psig which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferably that they be. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.016 to about 0.093 inches).

Generally, the number average molecular weight of the polyacrylamide, the partially hydrolyzed polyacrylamide or the sodium, potassium or ammonium salt thereof utilized in preparing the alkoxylated products of this invention will range from about 10,000 to about 2,000,000 or more. Such polyacrylamide materials are manufactured and sold by a number of chemical manufacturers and are prepared by the usual vinyl compound polymerization methods.

The partially hydrolyzed polyacrylamide which are useful in preparing the ethoxylation, partially hydrolyzed polyacrylamides employed in the drive fluid of this invention consist of about 12 to about 67 mole percent of recurring units of the formulas:

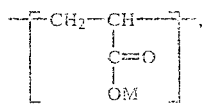

where M represents hydrogen, sodium, potassium or ammonium and about 33 to 88 mole percent of recurring units of the formula:

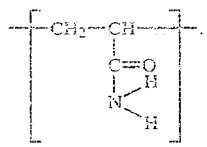

The preparation of such partially hydrolyzed polyacrylamides is well known in the art and is described in detail in U.S. Pat. Nos. 3,039,529; 3,002,960; 3,804,173, etc.

The alkoxylated polymers employed in the process of this invention comprise (1) polyacrylamide or (2) partially hydrolyzed polyacrylamide or the sodium, potassium or ammonium salt thereof alkoxylated with, i.e., reacted with, from about 2 to about 100 percent by weight of ethylene oxide or with a mixture of ethylene oxide and propylene oxide wherein the weight percent of ethylene oxide in the said mixture is about 60 to about 95. In another embodiment, alkoxylated polymers useful in the secondary recovery process of this invention are prepared by reacting polyacrylamide or partially hydrolyzed polyacrylamide with 2,3-epoxy-1-propanol (i.e., glycidol).

The alkoxylation of the acrylamide polymers, i.e., the reaction of these polymers with an alkylene oxide, can be conveniently conducted using methods well known in the art. For example, an aqueous solution comprising about 10 to about 30 weight percent or more of the acrylamide polymer in water along with about 0.5 weight percent or more of powdered potassium hydroxide or sodium hydroxide is charged to an autoclave and the autoclave and contents heated to a temperature of about 125° to about 200° C. after which the required weight of ethylene oxide or a mixture of ethylene oxide and propylene oxide is pressured with nitrogen into the autoclave over a period of 1 to about 3 hours or more following which the autoclave is allowed to cool to room temperature and then vented. The reaction product remaining after being stripped to remove volatile materials yields the water-soluble, alkoxylated polymer.

A number of other methods are set out in the art for conducting such alkoxylation reactions including those described in U.S. Pat. Nos. 2,213,477, 2,233,381; 2,131,142; 2,808,397; 3,879,475; 2,174,761; 2,425,845 3,062,747; 3,380,765 and German Offen. 2,021,066 of Nov. 11, 1971 (CA 76 86780b (1972)).

The following example which illustrates the preparation of the alkoxylated acrylamide polymers is to be considered not limitative.

EXAMPLE I

A total of 450 cc of water, 5 g. of powdered potassium hydroxide and 65 g. of polyacrylamide (number average molecular weight of about 250,000) are added to an autoclave which is then heated to a temperature of 125° C. Ethylene oxide in the amount of 40 g is added to the autoclave under nitrogen pressure over a 1.05 hour period during which time the temperature of the autoclave is maintained at 130° C. Next, the autoclave and contents are allowed to cool to room temperature after which the autoclave is vented. The reaction mixture is then stripped of volatiles using a nitrogen purge. The resulting water-soluble product is polyacrylamide alkoxylated with about 37 weight percent of ethylene oxide.

In the secondary recovery process of this invention, generally the aqueous drive fluid will contain from about 0.01 to about 5.0 weight percent or more of the alkoxylated polyacrylamide or alkoxylated partially hydrolyzed polyacrylamide or the sodium, potassium or ammonium salt thereof and, optionally, about 0.01 to about 5.0 weight percent of the water-soluble, sulfated, ethoxylated polyacrylamide or the sodium, potassium or ammonium salt therof. Optionally, the aqueous drive fluid may be saturated with carbon dioxide and/or natural gas at the injection pressure which generally will be from about 300 to about 3000 psig or more.

When polyacrylamide is reacted with an alkylene oxide where the alkylene group has from 2 to 4 inclusive carbon atoms and in the presence of sodium or potassium hydroxide the reaction is one which takes place with the active hydrogen atoms attached to the nitrogen atom of the $-NH_2$ group resulting in the formation of an alkoxylated polyacrylamide, i.e., an N-substituted, water-soluble polymer bearing N-substituents having the formula:

$$-(RO)_nH$$

wherein R is alkylene of from 2 to 4 inclusive carbon atoms and n is an integer of at least 1.

The water-soluble, sulfated, ethoxylated polyacrylamides useful in the drive fluids of this invention are N-substituted polyacrylamides having number average molecular weights of about 10,000 to about 2,000,000 or more and bearing N-substituents having the formula:

$$-(CH_2CH_2O)_mSO_3M,$$

wherein m is an integer of from 1 to 5 and M is selected from the group consisting of hydrogen, sodium, potassium or ammonium. Generally in the water-soluble, sulfated, ethoxylated polyacrylamides, the weight percent of the N-substituents of the formula:

$$-CH_2CH_2O_mSO_3M,$$

where m and M have the same meaning as previously described will range from about 1 to 50 or more. These water-soluble sulfated polymers can be prepared according to known methods by reacting ethoxylated polyacrylamide, i.e., polyacrylamide bearing N-substituents of the formula:

—(CH$_2$CH$_2$O)$_m$H, wherein m is an integer of from 1 to 5, and having a number average molecular weight of about 10,000 to about 2,000,000 or more with sulfuric acid, chlorosulfonic acid, sulfur trioxide, oleum or any other suitable sulfating agent. The corresponding sodium, potassium or ammonium derivative of these water-soluble, sulfated, ethoxylated polyacrylamides can be formed by neutralization with the corresponding alkali metal hydroxide or ammonium hydroxide. The preparation of such sulfated materials is more completely described in U.S. Pat. Nos. 3,508,612; 3,827,497 which are incorporated herein in their entirety by reference. The preparation of the starting polymers, i.e., the ethoxylated polyacrylamides, is described in detail in U.S. Pat. No. 2,808,397 which is incorporated herein in its entirety by reference.

If desired, the aqueous drive fluids having dissolved therein the above-described polymeric thickening agents may be made alkaline by addition of an alkaline agent. The advantageous results achieved with the aqueous alkaline medium used in the process of this invention are believed to be derived from the wettability improving characteristics of the alkaline agent.

Useful alkaline agents include compounds selected from the group consisting of alkali metal hydroxides, alkaline earth metal hydroxides, and the basic salts of the alkali metal or alkaline earth metals which are capable of hydrolyzing in an aqueous medium to give an alkaline solution. The concentration of the alkaline agent employed in the drive fluid is generally from about 0.005 to about 0.3 weight percent. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, potassium hypochlorite, sodium carbonate and potassium carbonate.

A wide variety of surfactants such as linear alkylaryl sulfonates, alkyl polyethoxylated sulfates, etc. may also be included as a part of any aqueous drive fluid compositions previously described. Generally about 0.001 to about 1.0 or more weight percent of the surfactant will be included in the drive fluid.

This invention is best understood by reference to the following examples which are offered only as an illustrative embodiment of this invention and are not intended to be limitative.

EXAMPLE II

In a field in which the primary production has already been exhausted, an injection well is completed in the hydrocarbon-bearing formation and perforations are formed between the interval of 6120–6135 feet. A production well is drilled approximately 410 feet distance from the injection well, and perforations are similarly made in the same hydrocarbon-bearing formation at 6125–6140 feet.

The hydrocarbon-bearing formation in both the injection well and the production well is hydraulically fractured using conventional techniques, and a gravel-sand mixture is injected into the fracture to hold it open and prevent healing of the fracture.

In the next step water saturated with carbon dioxide at 1250 psig at a temperature of 70° F. to which there has been added about 0.20 weight percent sodium hydroxide and containing dissolved therein 0.37 weight percent of polyacrylamide having a number average molecular weight of about 135,000 alkoxylated with about 14 weight percent of ethylene oxide in the manner previously described in Example I above is injected via the injection well into the formation at a pressure of about 1250 psig and at the rate of 0.95 barrel per minute. Injection of the driving fluid is continued at the rate of about 1 barrel per minute and at the end of 63 days the rate of production of oil is substantially greater than with water injection alone.

EXAMPLE III

An injection well is completed in the hydrocarbon-bearing formation in a field where the primary production has already been exhausted and perforations are formed between the interval of 4320–4340 feet. A production well is drilled approximately 430 feet distance from the injection well, and perforations are similarly made in the same hydrocarbon-bearing formation at 4325–4345 feet.

The hydrocarbon-bearing formation in both the injection well and the production well is hydraulically fractured using conventional techniques, and a gravel-sand mixture is injected into the fracture to hold it open and prevent healing of the fracture.

Water saturated with carbon dioxide at 1000 psig at a temperature of 70° F. and containing dissolved therein 0.42 weight percent of a partially hydrolyzed polyacrylamide having about 21 mole percent of the carboxamide groups originally present in the polyacrylamide hydrolyzed to carboxyl groups and having a number average molecular weight of about 148,000 alkoxylated with about 16 weight percent of ethylene oxide in the manner previously described in Example I above and containing dissolved therein 0.20 weight percent of a water-soluble, N-substituted polyacrylamide having a number average molecular weight of about 200,000 bearing N-substituents of the formula:

—(CH$_2$CH$_2$O)$_3$SO$_3$K, is injected via the injection well into the formation at a pressure of about 1000 psig and at the rate of 1.2 barrels per minute. Injection of the driving fluid is continued at the rate of about 1.2 barrels per minute and at the end of 78 days the rate of production of oil is substantially greater than with water injection alone.

What is claimed is:

1. A process for recovering hydrocarbons from a subterranean hydrocarbon-bearing formation penetrated by an injection well and a production well which comprises:
   (A) injecting into the formation via an injection well a drive fluid comprising water having dissolved therein about 0.01 to about 5.0 weight percent of an N-substituted polyacrylamide bearing N-substituents of the formula:

—(CH$_2$CH$_2$O)$_m$SO$_3$M wherein m is an integer of from 1 to 5 and M is selected from the group consisting of hydrogen, sodium, potassium and ammonium,
   (B) forcing the said fluid through the formation, and
   (C) recovering hydrocarbons through the production well, and wherein the number average molecular weight of the said N-substituted polyacrylamide is about 10,000 to about 2,000,000.

2. The process of claim 1 wherein the said drive fluid is saturated with a material selected from the group consisting of carbon dioxide and natural gas at a pressure of about 300 to about 3000 psig.

3. The process of claim 1 wherein about 0.005 to about 0.3 weight percent of an alkaline agent selected from the group consisting of sodium hydroxide, potassium hydroxide and sodium hypochlorite is included.

4. The process of claim 1 wherein about 0.001 to about 1.0 weight percent of a surfactant selected from the group consisting of alkylaryl sulfonates and alkyl polyethoxylated sulfates is included.

5. A process for recovering hydrocarbons from a subterranean hydrocarbon-bearing formation penetrated by an injection well and a production well which comprises:
(A) injecting into the formation via a injection well a drive fluid comprising water having dissolved therein about 0.01 to about 5.0 weight percent of a polymer selected from the group consisting of polyacrylamide and partially hydrolyzed polyacrylamide or the sodium, potassium or ammonium salt thereof alkoxylated with a material selected from the group consisting of
(a) ethylene oxide and
(b) a mixture of ethylene oxide and propylene oxide wherein in the said mixture the weight percent of ethylene oxide ranges from about 65 to about 95, and wherein the number average molecular weight of the said alkoxylated polymer is from about 10,000 to about 2,000,000, and wherein the said drive fluid also contains dissolved therein about 0.01 to about 5.0 weight percent of an N-substituted polyacrylamide bearing N-substituents of the formula:

—(CH$_2$CH$_2$O)$_m$SO$_3$M wherein m is an integer of from 1 to 5 and M is selected from the group consisting of hydrogen, sodium, potassium and ammonium, and wherein the number average molecular weight of the said N-substituted polyacrylamide is about 10,000 to about 2,000,000,
(B) forcing the said fluid through the formation, and
(C) recovering hydrocarbons through the production well.

6. The process of claim 5 wherein the said drive fluid contains a surfactant.

7. The process of claim 5 wherein the said drive fluid is saturated with a material selected from the group consisting of carbon dioxide and natural gas at a pressure of about 300 to about 3000 psig.

8. The process of claim 5 wherein the said polymer is partially hydrolyzed polyacrylamide or the sodium, potassium or ammonium salt thereof.

9. The process of claim 5 wherein the said drive fluid includes about 0.005 to 0.3 weight percent of an alkaline agent selected from the group consisting of sodium hydroxide, potassium hydroxide and sodium hypochlorite.

10. A fluid for use in recovering hydrocarbons from a subterranean formation comprising water having dissolved therein about 0.01 to about 5.0 weight percent of an N-substituted polyacrylamide bearing N-substituents of the formula:

—(CH$_2$CH$_2$O)$_m$SO$_3$M wherein m is an integer of from 1 to 5 and M is selected from the group consisting of hydrogen, sodium, potassium and ammonium, and wherein the number average molecular weight of the said N-substituted polyacrylamide is about 10,000 to about 2,000,000.

11. The fluid of claim 10 saturated a material selected from the group consisting of carbon dioxide and natural gas at a pressure of about 300 to about 3000 psig.

12. The fluid of claim 10 wherein about 0.005 to about 0.3 weight percent of an alkaline agent selected from the group consisting of sodium hydroxide, potassium hydroxide and sodium hypochlorite is included.

13. The fluid of claim 10 wherein about 0.001 to about 1.0 weight percent of a surfactant selected from the group consisting of alkylaryl sulfonates and alkyl polyethoxylated sulfates is included.

14. A fluid for use in recovering hydrocarbons from a subterranean formation comprising water having dissolved therein about 0.01 to about 5.0 weight percent of a polymer selected from the group consisting of polyacrylamide or partially hydrolyzed polyacrylamide or the sodium, potassium or ammonium salt thereof alkoxylated with about 2 to about 100 weight percent of a material selected from the group consisting of
(a) ethylene oxide and
(b) a mixture of ethylene oxide and propylene oxide and wherein in the said mixture the weight percent of ethylene oxide is about 60 to about 95, wherein the number average molecular weight of the said alkoxylated polyacrylamide or partially hydrolyzed polyacrylamide is about 10,000 to about 2,000,000, wherein the said fluid also contains dissolved therein from about 0.01 to about 5.0 weight percent of an N-substituted polyacrylamide bearing N-substituents of the formula:

—(CH$_2$CH$_2$O)$_m$SO$_3$M, wherein m is an integer of from 1 to 5 and M is selected from the group consisting of hydrogen, sodium, potassium and ammonium, and wherein the number average molecular weight of the said N-substituted polyacrylamide is about 10,000 to about 2,000,000.

15. The fluid of claim 14 saturated with a material selected from the group consisting of carbon dioxide and natural gas at a pressure of about 300 to about 3000 psig.

16. The fluid of claim 14 wherein about 0.005 to about 0.3 weight percent of an alkaline agent selected from the group consisting of sodium hydroxide, potassium hydroxide and sodium hypochlorite is included.

17. The fluid of claim 14 wherein about 0.001 to about 1.0 weight percent of a surfactant selected from the group consisting of alkylaryl sulfonates and alkyl polyethoxylated sulfates is included.

* * * * *